United States Patent
Ritter et al.

(10) Patent No.: US 6,934,689 B1
(45) Date of Patent: Aug. 23, 2005

(54) PAYMENT TRANSACTION METHOD AND PAYMENT TRANSACTION SYSTEM

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/701,288

(22) PCT Filed: Oct. 25, 1999

(86) PCT No.: PCT/CH99/00503

§ 371 (c)(1),
(2), (4) Date: Nov. 28, 2000

(87) PCT Pub. No.: WO01/31594

PCT Pub. Date: May 3, 2001

(51) Int. Cl.[7] .............................................. G06F 17/60
(52) U.S. Cl. ........................................ 705/17; 705/16
(58) Field of Search ..................... 705/16, 17; 235/380; 379/55.1, 56.3; 455/556

(56) References Cited

U.S. PATENT DOCUMENTS

| | | | | |
|---|---|---|---|---|
| 4,984,270 A | * | 1/1991 | LaBounty ..................... | 705/72 |
| 5,557,088 A | * | 9/1996 | Shimizu et al. ............. | 235/383 |
| 5,943,610 A | * | 8/1999 | Endo ............................ | 455/69 |
| 5,979,757 A | * | 11/1999 | Tracy et al. ................. | 235/383 |
| 5,991,749 A | * | 11/1999 | Morrill, Jr. .................. | 705/44 |
| 6,016,476 A | * | 1/2000 | Maes et al. .................... | 705/1 |
| 6,250,557 B1 | * | 6/2001 | Forslund et al. ............. | 235/492 |
| 6,356,752 B1 | * | 3/2002 | Griffith ........................ | 455/406 |
| 6,394,341 B1 | * | 5/2002 | Makipaa et al. ............. | 235/379 |
| 6,418,326 B1 | * | 7/2002 | Heinonen et al. ............ | 455/575 |
| 6,424,845 B1 | * | 7/2002 | Emmoft et al. .............. | 455/575 |
| 6,445,932 B1 | * | 9/2002 | Soini et al. .................. | 455/556 |

FOREIGN PATENT DOCUMENTS

| | | |
|---|---|---|
| EP | 0 708 547 A2 | 4/1996 |
| WO | WO 96/25828 | 8/1996 |

(Continued)

OTHER PUBLICATIONS

Schlumberger EFTPOS Primed for Electronic Payments Asia: New EFTPOS Terminal from Schlumberger. Asia Computer Weekly. Jul. 13, 1997. p. 14.*

*Primary Examiner*—James S. McClellan
(74) *Attorney, Agent, or Firm*—Oblon, Spivak, McClelland, Maier & Neustadt, P.C.

(57) ABSTRACT

Payment transaction method and payment transaction system in which payment transactions between customers with portable mobile devices, for example mobile radio telephones, and a plurality of payment terminals are carried out at a service point, the payment terminal responsible for a payment transaction informing a respective customer about the total transaction amount and the transaction identification of the payment transaction, the transaction identification comprising a payment terminal identification, the mobile device transmitting, via a contactless device interface, the transaction identification, entered in the mobile device by the customer, to the payment terminal, identified through the payment terminal identification, the payment terminal transmitting, after receipt of the transaction identification, a payment request comprising a service point identification, the payment terminal identification and the total transaction amount, via the contactless device interface to the mobile device, and a payment record which comprises the payment request and a customer identification, being prepared in the mobile device and being transmitted from the mobile device via the contactless device interface to the payment terminal.

25 Claims, 1 Drawing Sheet

FOREIGN PATENT DOCUMENTS

| WO | WO 98/11519 | 3/1998 |
| WO | WO 98/34203 | 8/1998 |
| WO | WO 98/37524 | 8/1998 |
| WO | WO 98/58510 | 12/1998 |
| WO | WO 99/08238 | * 2/1999 |

* cited by examiner

PAYMENT TRANSACTION METHOD AND PAYMENT TRANSACTION SYSTEM

This application is the national phase of international application PCT/CH99/00503 filed Oct. 25, 1999 which designated the U.S.

BACKGROUND OF THE INVENTION

1. Field of the Invention

This invention relates to a payment transaction method and a payment transaction system. In particular, the present invention relates to a payment transaction method as set forth in the preamble of the independent method claim 1 and a payment transaction system for execution of this payment transaction method.

2. Discussion of the Background

Owing to the increasing popularity and spread of mobile telephony, more and more customers of service points, so-called points of sale (POS), for example points of sale of products and/or services, are equipped with portable mobile telephones, in particular mobile radio telephones, which support the identification and authentication of a respective customer. Since non-cash forms of payment are being used more and more frequently for paying for products and/or services at the service point, and the customers are provided with numerous different identification cards for this purpose from the various service points, there has been a desire to use the above-mentioned portable mobile devices for this purpose. Conventional mobile radio telephones comprise an identification module, a so-called SIM (Subscriber Identification Module) chipcard, which contains a clear user identification, for example an IMSI (International Mobile Subscriber Identity), by means of which the respective user can be identified in a telecommunications network. To prevent the use of such a mobile device by an unauthorized user, a user must first authenticate himself at the mobile device, for example by entering a personal code (Personal Identification Number, PIN) by means of operating elements of the mobile device, which code, with the aid of security services, is compared with a value stored on the SIM chipcard.

Described in the patent application EP 708 547 A2 is the use of a mobile radio telephone as the authenticated transaction controller. According to the teaching disclosed in EP 708 547 A2, a customer first authenticates himself in a sales store at his mobile radio telephone, for example through entry of a personal identification code; afterwards the store operator and the customer agree upon a transaction password, which is entered in his mobile radio telephone by the customer, and is transmitted wirelessly, together with identification data, for example the appliance number and the telephone number of the mobile radio telephone, to a receiver of a payment terminal of the sales store. According to the teaching disclosed in EP 708 547 A2, the respective amount to be paid, which is either supplied by the payment terminal or is entered by the customer in his mobile radio telephone and is transmitted together with the transaction password and the identification data to the receiver of the payment terminal, and the identification data are passed on by the sales store to a credit center for credit checking. The transaction password described in EP 708 547 A2 makes it possible in particular for the payment terminal to assign the data on the respective transaction transmitted from the mobile radio telephone, and thereby not be interfered with through possible transmissions from other mobile radio telephones.

BRIEF SUMMARY OF THE INVENTION

It is the object of this invention to propose a new and better payment transaction method and a new and better payment transaction system, which can be used in particular for service points with a plurality of payment terminals and a plurality of customers with mobile devices.

According to the invention, this object is attained in particular through the elements of the independent claims. Further preferred embodiments follow moreover from the dependent claims and from the specification.

This object is achieved through the present invention in particular in that:

in the payment transactions between a customer with a portable mobile device, for example a mobile radio telephone or a palm or laptop computer, capable of communication, and a service point with a plurality of payment terminals, in which payment transactions a payment terminal of the service point determines a total transaction amount to be paid and a transaction identification assigned to this total transaction amount, and informs the customer about this total transaction amount and this transaction identification, the payment terminal adds a payment terminal identification to the transaction identification upon determining the transaction identification, which payment terminal identification makes it possible to identify the respective payment terminal from a plurality of payment terminals existing at the service point;

via a contactless device interface, for example an infrared interface or a radio interface, the mobile device transmits the transaction identification entered into the mobile device by the customer to the payment terminal identified through the payment terminal identification;

after receipt of the transaction identification, the payment terminal transmits a payment request, containing at least one service point identification, the payment terminal identification and the total transaction amount, via the contactless device interface to the mobile device, and in the mobile device, a payment record is prepared which comprises a linking of the payment request to a customer identification of the customer, and transmits it from the mobile device to the payment terminal via the contactless device interface.

Thus in the payment transaction method and payment transaction system according to the invention, a payment transaction between a customer with a portable mobile device and a service point with a plurality of payment terminals is carried out in two phases. In the first phase, in which the transaction identification is determined, is made known, is entered by the customer in his mobile device, and is transmitted to the payment terminal, identified through the transaction identification, the payment terminal taking part in the respective payment transaction and the mobile device taking part in the respective payment transaction are assigned to one another, a logical communication link being established, for example, between these payment transaction partners. Then, in the second phase, the financial aspect of the payment transaction can be carried out between the payment transaction partners, the payment request of the payment transaction being transmitted from the payment terminal to the mobile device taking part in the respective payment transaction, and, for example after the payment request has been accepted by the respective customer by means of operating elements of the mobile device, a payment record being prepared in the mobile device in that the payment request is linked to a customer identification of the customer, and, for example, is provided with an electronic signature of the customer, or is executed as a secured certificate, and the payment record being transmitted from the mobile device to the payment terminal taking part in the respective payment transaction, where the payment record is further processed and/or passed on, for example to a clearing point.

The advantage of this two-phase procedure consists in that prior to the exchange of financial data of the cashless payment transaction, the payment transaction partners are clearly assigned to one another, whereby the authenticity of the two partners can also be checked, for example, so that payment requests from a payment terminal can be automatically transmitted to the responsible mobile device, and made available there to the responsible customer, and payment records, which can be provided in particular with an electronic signature of the customer, can be automatically transmitted from the responsible mobile device to the responsible payment terminal.

During transmission of the transaction identification, entered by the customer, from the mobile device to the payment terminal, a sender identification is preferably co-transmitted, for example an appliance identification of the mobile device or a logical or physical address of the contactless interface of the mobile device, and the payment request from the payment terminal is transmitted to the mobile device, determined through this sender identification. The advantage of the co-transmitted sender identification consists in that the payment terminal can address a mobile device directly as the payment transaction partner, and other mobile devices, which are not participating in the respective payment transaction, do not have to examine the contents of unaddressed communications received from a plurality of payment terminals.

In an embodiment variant, the payment terminal increases at least once the transmitting power of the contactless device interface and transmits the payment request with the increased transmitting power to the mobile device if the payment terminal has not received any payment record from the mobile device within a predefined time period from the transmission of the payment request without power increase to the mobile device. The varying of the transmitting power has the advantage that, on the one hand, other mobile devices, which are not participating in the respective payment transaction and are usually located at a greater distance from the payment terminal than a mobile device taking part in the payment transaction, are not unnecessarily disturbed by communications of the payment terminal, and that, on the other hand, if the mobile device taking part in the payment transaction is located outside the range of the not increased transmitting power of the payment terminal, it can nevertheless still be reached through the increase in the transmitting power.

Before transmission of the payment record to the payment terminal, data about the type of payment are preferably added to the payment record in the mobile device, for example charging to a particular credit card number, debiting a particular customer account, debiting a particular bank account, or debiting from a prepaid monetary amount stored in the mobile device, for example on the SIM card of the mobile device. The addition of data about the intended type of payment has the advantage that the flexibility of the payment transaction method and payment transaction system according to the invention is thereby increased, and that, depending upon the type of desired payment type, at least certain payment transactions can be entered directly (on-line) and automatically, while others can be entered subsequently (off-line), for example with the aid of a clearing point suitable for this purpose.

In an embodiment variant, the payment record is stored in the mobile device, for example on the SIM card of the mobile device. The advantage of storing of payment records in the mobile device consists in that it is thereby made possible for the customer to keep records about payment transactions made and to use a payment record stored in the mobile device as a receipt, in particular when the payment request contained in the payment record includes a certificate or an electronic signature of the respective service point.

In an embodiment variant, the customer authenticates himself at his mobile device, for example with a biometric feature, for example a fingerprint, a voice pattern or an eye pattern. The use of biometric features for authentication of a user has the advantage that the security entailed therewith is higher than with the use of a personal code, which can be guessed by wrongful users, for example, or can be forgotten by the rightful user.

BRIEF DESCRIPTION OF THE DRAWINGS

One embodiment of the present invention will be described in the following with reference to an example. The example of the embodiment will be illustrated by the following single attached FIGURE.

DETAILED DESCRIPTION OF THE INVENTION

Figure 1:
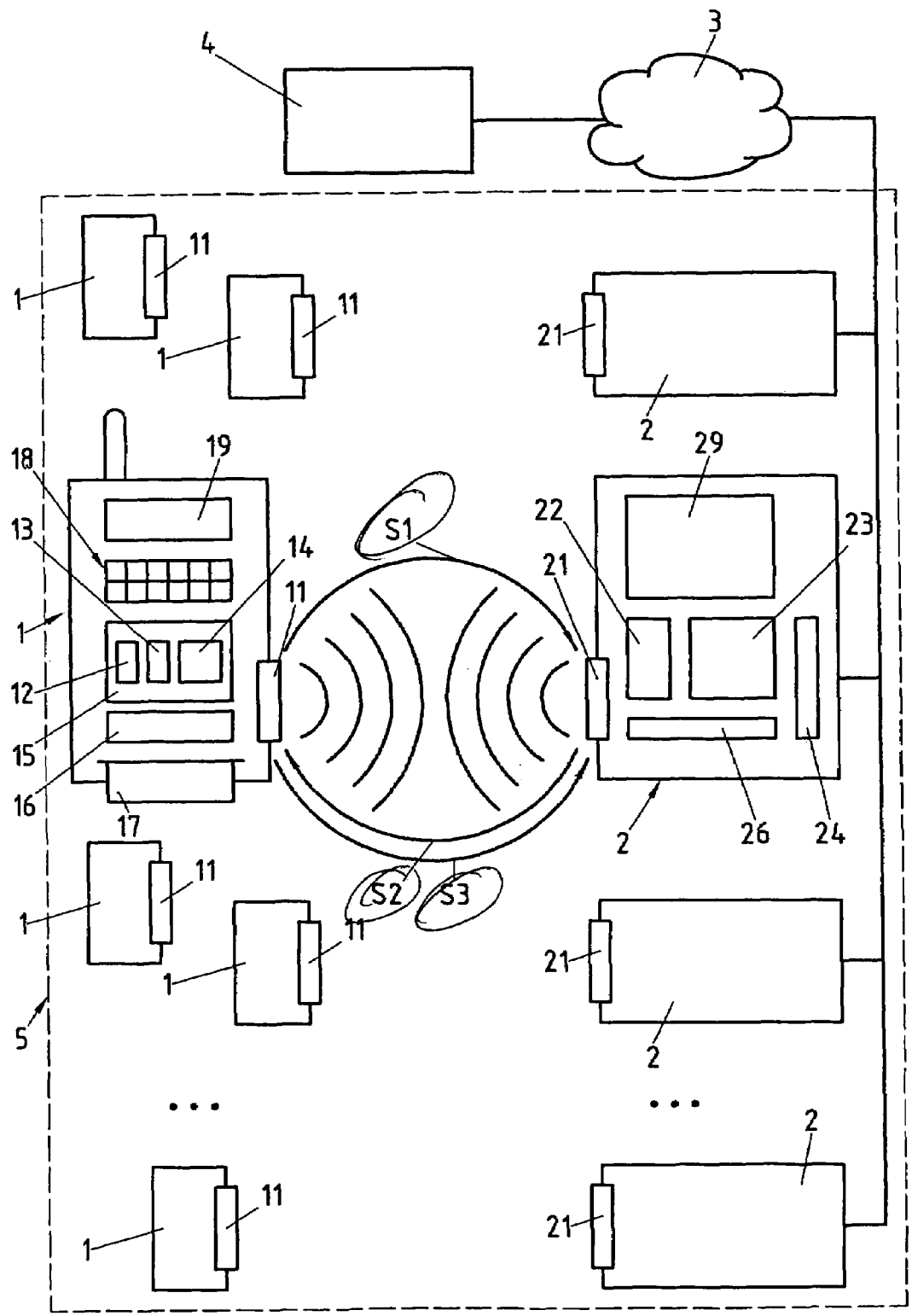
FIG. 1 shows a block diagram which illustrates schematically a service point in which a plurality of mobile devices and a plurality of payment terminals are located, the payment terminals being connected to a clearing point via a telecommunications network.

In FIG. 1, elements designated by the same number, are to be considered as equivalent elements. The reference numeral 5 in FIG. 1 relates to a service point, a so-called point of sale (POS), for example a sales point for products and/or services accessible to the public. As illustrated in FIG. 1, a plurality of payment terminals 2 and a plurality of mobile devices 1 carried by customers are located at the service point 5.

The portable mobile devices 1 are, for example, mobile radio telephones, laptop or palmtop computers or other suitable portable mobile devices which have a contactless device interface 11 in order to communicate with corresponding contactless device interfaces 21 of the payment terminals 2, i.e. to exchange data bidirectionally.

The contactless device interfaces 11, 21 shown schematically in FIG. 1 each comprise the necessary hardware elements for the transmitter and receiver of the contactless device interface, for the control of the contactless device interface as well as for the connection of the contactless interface to a processor 16, 26 of the mobile device 1, respectively of the payment terminal 2. The contactless device interfaces 11, 21 shown schematically in FIG. 1 each additionally comprise programmed software modules and software interfaces which are needed for the operation and control of the contactless interface 11, 21, and which also execute the communications protocol or protocols necessary for communications processing. The contactless device interfaces 11, 21 are, for example, infrared interfaces, for example High Speed Infrared (HSIR) interfaces or IrDA (Infrared Data Association) interfaces, inductive interfaces, for example Radio Frequency Identification (RFID) interfaces, Home RF (Radio Frequency) interfaces, Digital European Cordless Telecommunications (DECT) interfaces or other Cordless Telecommunications System (CTS) interfaces, or high-frequency radio interfaces, in particular so-called bluetooth interfaces, which work, for example, at 2.4 GHz, and at the time of writing the application for the present invention were described on the Internet on the page www.bluetooth.com.

The term "software module" used in the present specification relates in each case to a program code which is stored in a memory and is executed on a processor, for example in cooperation with suitable operational systems and/or with the aid of services of virtual platforms, e.g. Java Virtual Machine (Java is a registered trademark of Sun Microsystems), so that the processor can be controlled in such a way that it executes the respective functions associated with the software module. One skilled in the art will understand that the programming language used for execution of the software module does not change the sense of the present invention, but that however the use of certain programming languages, for example Java or another object-oriented and platform-independent programming language, can very well have advantages known to one skilled in the art.

The payment terminals 2 are based, for example, on conventional electronic point of sale systems, which are equipped with operating elements and price detection components (not shown), e.g. laser scanners, and comprise at least one processor 26 as well as a contactless device interface 21, described above. The payment terminals 2 comprise a transaction identification module 22, which is designed as the programmed software module, for example, which establishes a transaction identification for a payment transaction. This transaction identification contains at least one payment terminal identification, which makes it possible to determine a payment terminal 2 in question from among the plurality of payment terminals 2 existing at the service point 5, as well as a transaction number which is incremented progressively, for example, with each new payment transaction.

The transaction identification determined for a payment transaction is displayed by the payment terminal 2, for example by the transaction identification module 22 or by another programmed software module of the payment terminal 2, on a display 29 of the payment terminal 2 together with the total transaction amount to be paid by the respective customer, determined by the payment terminal 2 for this payment transaction. The respective customer is thereby informed about the total transaction amount and the transaction identification for the payment transaction.

If the customer would like to pay the total amount of the payment transaction by means of his mobile device 1, he switches on his mobile device 1, and, to be on the safe side, in an embodiment variant, is requested by an authentication module 12 of the mobile device 1, for example a programmed software module, to authenticate himself. The customer is asked, for example, to enter a personal identification code (Personal Identification Number, PIN), which is received by the authentication module 12 and is compared with a code stored in a protected way in the mobile device 1, for example on a SIM card 17 (Subscriber Identification Module) of the mobile device 1. In a variant, the authentication module has moreover hardware components and further software components in order to receive a biometric feature from the customer for authentication and to compare it with a biometric feature previously stored in a protected way in the mobile device 1, for example on a SIM card 17 of the mobile device 1. The biometric feature is, for example, a voice pattern, which is recorded by means of a microphone of the mobile device 1, a fingerprint or a facial feature, which are captured with a video sensor of the mobile device 1, or an eye pattern, e.g. a pattern of the iris or the retina, which is recorded with a suitable scanner.

After successful authentication, if applicable, the customer selects on his mobile device 1, for example by means of the operating elements 18, the function "payment transaction" from a function menu shown on the display 19 of the mobile device 1. The menu and function flow control is carried out, for example, through a programmed software module of the mobile device 1, e.g. through a Java applet, which is stored, for example, on the SIM card 17 of the mobile device 1. The software module or modules for execution of the function "payment transaction" can be disabled for security reasons, for example by an operator in charge via the contactless device interface 11 or via a mobile radio network (not shown), for example in that a signed or certified command is transmitted to the mobile device 1 using suitable messages.

After selection of the function for the payment transaction, the user is prompted by the transaction response module 13 of the mobile device 1, for example a programmed software module, to enter the transaction identification for the respective payment transaction. The customer can type in the transaction identification, for example, by means of the operating elements 18 of the mobile device 1. To prevent entry errors, in a variant, the transaction response module 13 can request, via the contactless device interface 11, 21, from the payment terminal 2 the transaction identifications of the current payment transactions so that the customer can enter the transaction identification for the respective payment transaction by selecting the respective transaction identification by means of operating elements 18 of the mobile device 1 from a list of current transaction identifications displayed on the display 19 of the mobile device 1.

The transaction response module 13 takes from the transaction identification received from the customer the payment terminal identification contained therein, and transmits, as indicated by the arrow S1 in FIG. 1, the transaction identification to the payment terminal 2 identified through this payment terminal identification. One skilled in the art will understand that, depending upon the type of contactless device interface 11, 21, the payment terminal identification can thereby be used by the transaction response module 13 as address on the physical layer or as address on one of the above-lying layers (protocol layer), according to the OSI reference model (Open Systems Interconnection) defined by the ISO (International Standards Organisation). In transmitting the transaction identification to the respective payment terminal 2, a sender identification, identifying the respective mobile device 1, or respectively the contactless interface 11 of the respective mobile device 1, is added by the transaction response module 13, or by corresponding functions of the contactless device interface 11, to the transaction identification for co-transmission.

In the payment terminal 2 in question, the transmitted transaction identification, and if applicable the added sender identification, is received via the contactless interface 21, and a logical communications link is established, for example, between the payment terminal 2 and the mobile device 1. Then prepared by a payment request module 23 of the respective payment terminal 2, for example a programmed software module, is a payment request containing at least the service point identification of the service point 5, the payment terminal identification of the respective payment terminal 2 as well as the total transaction amount to be paid for the respective payment transaction. One skilled in the art will understand that the service point identification and the payment terminal identification can also be replaced by a clear, combined payment terminal identification; however a transaction identification thereby results which is not suitable for manual typing into a mobile device 1, however, owing to the number of necessary digits. The payment request module 23 transmits the prepared payment request, as indicated by the arrow S2 in FIG. 1, via the contactless device interface 21 to the mobile device 1 from which the transaction identification was received. For this purpose the payment request module 23 uses the sender identification received from this mobile device 1, or respectively the previously established logical communications link, or, in a variant, transmits the payment request in a broadcasting way, the payment request being filtered in the receiving mobile devices 1 on the basis of the transaction identification. It should be mentioned here that, to increase security, in particular to establish the authenticity of the payment terminal 2, the payment request is provided with an electronic signature of the service point 5 by the payment request module 23, or is executed as a secured certificate.

In the mobile device 1 in question, the transmitted payment request is received via the contactless interface 11, and, depending upon the variant, is filtered, if applicable, on the basis of the transaction identification contained therein, in that the transaction identification contained in the payment request is compared by the mobile device 1 with the transaction identification previously transmitted to the payment terminal 2. A payment record is prepared in a payment record module 14 of the mobile device 1, for example a programmed software module, on the basis of the received payment request, for example after the authenticity of the payment request, respectively the authenticity of the payment terminal 2, has been checked and the payment request has been displayed to the customer on the display 19 of the mobile device 1, and the customer, by means of the operating elements 18 of the mobile device 1, has accepted and thereby enabled the payment. The prepared payment record comprises the received payment request and a customer identification of the customer, for example a IMSI (International Mobile Subscriber Identity) or a user number especially allocated for this type of payment described here, which in each case are stored on the SIM card 17 of the mobile device 1. To improve security, the payment record can be provided with an electronic signature of the respective customer by the payment record module 14, or can be executed as a secured certificate.

In addition, the payment record module 14 preferably adds to the payment record indications about the desired type of payment, which indications are stored, for example, as the default value in the SIM card 17 of the mobile device 1 or are requested by the respective customer via the display 19 of the mobile device 1 and are received via the operating elements 18. The indications about the desired type of payment specify, for example, a desired charging of the total transaction amount to a particular credit card number, a debiting of a particular customer account, a debiting of a particular bank account or a debiting from a prepaid monetary amount stored in the mobile device, for example on the SIM card of the mobile device. The payment record module 14 transmits the prepared payment record, as indicated by the arrow S3 in FIG. 1, via the contactless device interface 11, 21 to the payment terminal 2 from which the payment request was received. The payment records are preferably stored, for example by the payment record module 14, in a memory 15 of the mobile device 1, for example on a SIM card 17 of the mobile device 1, so that they can be used later as a receipt and/or so that they are available to the respective customer for administrating the payment transactions he has made.

The payment record is received in the respective payment terminal 2, for example by the payment request module 23, and is further processed, taking into consideration the indications contained therein about the type of payment desired by the customer, if applicable, and the purchased products and/or services are released to the customer, for example after successful checking of the credit worthiness of the customer and/or after checking of the signature of the customer. By means of a communications module 24, the payment records can be passed on, for example, to a clearing point 4 via the telecommunications network 3.

If, within a predefined time period from the transmission of the payment request, the payment request module 23 has received no payment record from the mobile device 1, the payment request module 23, in a variant embodiment, can increase the transmitting power of the contactless device interface 21, for example via the software interface of the contactless device interface 21, and can transmit the payment request again. The normally used transmitting power can thereby be calculated in such a way that it suffices to transmit data successfully from the payment terminal 2 via the contactless device interface 21 to the mobile device 1 when the mobile device 1 is located in the immediate vicinity of the payment terminal 2 in question, for example within one to two meters, without thereby disturbing mobile devices 1 further away.

As has already been mentioned in connection with the menu and function flow control for the selection of the function "payment transaction", the software modules, in particular the transaction response module 13 and the payment record module 14 as well as software components of the authentication module 12, can be stored, for example as Java applet, e.g. on the SIM card 17 of the mobile device, and can also be executed on a processor of the SIM card 17, for example. The software modules can moreover be designed so that they can be disabled by an authorized operator via the contactless device 11 or via a mobile radio network (not shown), for example if the owner of the mobile device 1 has reported the loss of the mobile device 1 in question to an operator in charge.

It should be pointed out here that in the above specification, only mobile radio devices and palm and laptop computers have been cited as concrete examples for the mobile device 1. One skilled in the art will understand, however, that also other mobile devices can be used, in particular simpler mobile devices 1 with suitable contactless device interfaces 11, which mobile devices 1 do not comprise any mobile telephone components for communication over a mobile radio network, for example, and which have only the necessary software module and hardware components for participating in the described method, and which are made available, for example, to the customer by the service point 5 for their stay at the service point 5, and into which the customers can insert their personal chipcards, for example SIM cards 17, in particular for authentication and identification purposes, but also for the storing of payment records.

Furthermore, as a final point, it should be added that, to increase security, the data transmissions via the contactless interface 11, 21 can be encrypted according to a method known to one skilled in the art.

LIST OF REFERENCE SYMBOLS 1 mobile device
2 payment terminal
3 telecommunications network
4 clearing point
5 service point (POS)
11 contactless device interface
12 authentication module
13 transaction response module
14 payment record module
15 memory means
16 processor
17 SIM card
18 operating elements
19 display
21 contactless device interface
22 transaction identification module
23 payment request module
24 communications module
26 processor
29 display
S1 transmission of the transaction identification
S2 transmission of the payment request
S3 transmission of the payment record

What is claimed is:

1. Payment transaction method for conducting a payment transaction between a customer with a portable mobile device and a service point, comprising:
   determining a total transaction amount to be paid and a transaction identification assigned to the total transaction amount at a payment terminal of the service point, wherein the transaction identification includes a payment terminal identification identifying the respective payment terminal from a plurality of payment terminals existing at the service point;
   informing the customer about the total transaction amount and the transaction identification;
   entering the transaction identification into the mobile device;
   extracting the payment terminal identification from the transaction identification;
   transmitting by the mobile device, via a first contactless device interface, the transaction identification directly to the payment terminal based on the payment terminal identification;
   transmitting by the payment terminal, after receipt of the transaction identification, a payment request including a service point identification, the payment terminal identification, and the total transaction amount, via a second contactless device interface directly to the mobile device; and
   accepting the payment transaction based on the payment request by,
      preparing a payment record in the mobile device, the payment record including a linking of the payment request to a customer identification of the customer, and
      transmitting the payment record from the mobile device via the first contactless device interface directly to the payment terminal.

2. Payment transaction method according to claim 1, wherein,
   during the transmission of the transaction identification from the mobile device to the payment terminal, a sender identification is co-transmitted, and
   the payment terminal transmits the payment request to the mobile device based on the sender identification.

3. Payment transaction method according to claim 1, wherein the payment terminal increases a transmitting power of the second contactless device interface at least once, and transmits the payment request with the increased transmitting power to the mobile device if the payment terminal has not received any payment record from the mobile device within a predefined time period from the transmission of the payment request without power increase to the mobile device.

4. Payment transaction method according to claim 1, wherein in the mobile device data regarding a type of payment is added to the payment record before transmission of the payment record to the payment terminal.

5. Payment transaction method according to claim 1, wherein the customer is identified at the mobile device with a biometric feature before entering of the transaction identification.

6. Payment transaction system comprising:
   a plurality of portable mobile devices; and
   a plurality of payment terminals at a service point, wherein,
   each of the mobile devices and the payment terminals includes at least one processor and one contactless device interface,
   the mobile devices and the payment terminals are configured to communicate directly with one another via the contactless device interfaces,
   each of the payment terminals includes means for informing a customer about a total transaction amount to be paid of a payment transaction and a transaction identification assigned to the payment transaction,
   each of the payment terminals includes a transaction identification module configured to determine the transaction identification for a payment transaction and to add a payment terminal identification for the respective payment terminal to the transaction identification,
   each of the mobile devices includes a transaction response module configured to receive a transaction identification, to extract the payment terminal identification from the transaction identification, and to transmit the transaction identification via a first contactless device interface directly to the payment terminal determined based on the payment terminal identification contained in the transaction identification,
   each of the payment terminals includes a payment request module configured to, after receipt of a transaction identification from a mobile device, transmit a payment request, comprising a service point identification of the service point, the payment terminal identification of the respective payment terminal, and the total transaction amount of the payment transaction, determined through the received transaction identification, via a second contactless device interface directly to the mobile device from which the transaction identification was received, and
   each of the mobile devices includes a payment record module configured to prepare a payment record comprising a payment request received by the mobile device from a payment terminal and a customer identification of the respective customer, and to transmit the prepared payment record via the first contactless device interface directly to the payment terminal from which the payment request was received.

7. System according to claim 6, wherein,
each of the mobile devices includes means for co-transmitting a sender identification when transmitting the transaction identification entered by the customer to the payment terminal, and
the payment request module includes means for transmitting the payment request to the mobile device determined through the sender identification.

8. System according to claim 6, wherein,
each of the payment terminals includes means for increasing the transmitting power of the contactless device interface,
the payment request module includes means for transmitting the payment request with increased transmitting power to a respective mobile device if the payment terminal has not received a payment record from the respective mobile device within a predefined time period from transmission of the payment request without power increase to the respective mobile device.

9. System according to claim 6, wherein the payment record module includes means for adding to the payment record data on the type of payment before the transmission of the payment record to a payment terminal.

10. System according to claim 6, wherein each of the mobile devices includes an authentication module to receive at least one biometric feature from a customer and to authenticate the customer on the basis of the received biometric feature.

11. A method for performing a payment transaction, comprising:
inputting a transaction identification into a mobile device, the transaction identification including a payment terminal identification identifying a payment terminal;
extracting the payment terminal identification from the transaction identification;
transmitting via contactless communication the transaction identification from the mobile device directly to the payment terminal based on the payment terminal identification;
preparing a payment request in the payment terminal based on the transaction identification, the payment request including the payment terminal identification;
transmitting via contactless communication the payment request from the payment terminal directly to the mobile device; and
accepting the payment transaction by,
preparing a payment record in the mobile device based on the received payment request, and
transmitting via contactless communication the payment record from the mobile device directly to the payment terminal.

12. The method of claim 11, wherein,
a sender identification is transmitted together with the transaction identification from the mobile device to the payment terminal, the sender identification identifying the mobile device, and
the payment request is transmitted based on the sender identification.

13. The method of claim 11, further comprising:
retransmitting the payment request at an increased transmitting power when the payment terminal does not receive a payment record from the mobile device within a predetermined time period.

14. The method of claim 11, further comprising:
detecting a biometric feature of a user of the mobile device; and
authorizing use of the mobile device based on the detected biometric feature.

15. A system for performing a payment transaction, comprising:
a mobile device including,
a first interface,
first means for requesting a transaction identification including a terminal identification, for receiving the transaction identification, for extracting the terminal identification from the transaction identification, and for transmitting the transaction information and a sender identification via the first interface based on the terminal identification, and
second means for preparing a payment record based on a received payment request; and
a terminal including,
a second interface configured to bidirectionally communicate with the first interface in a contactless and direct manner, and
third means for preparing a payment request including the terminal identification based on the transaction information received from the first interface, and for transmitting the payment request directly to the first interface via the second interface, wherein,
the terminal identification identifies the terminal, and
the sender information identifies the mobile device.

16. The system of claim 15, wherein the terminal includes fourth means for establishing the transaction identification.

17. The system of claim 15, wherein the mobile device includes means for detecting a biometric feature of a user of the mobile device and for authorizing use of the mobile device based on the detected biometric feature.

18. The method of claim 1, wherein the entering includes using operating elements of the mobile device to manually enter the transaction identification into the mobile device.

19. The method of claim 1, wherein the entering includes receiving the transaction identification directly from the second contactless device interface by the first contactless device interface.

20. The system of claim 6, wherein each transaction response module is configured to receive the transaction identification by operation of operating elements of the respective mobile device.

21. The system of claim 6, wherein each transaction response module is configured to receive the transaction identification directly from the first contactless device interface of the respective mobile device.

22. The method of claim 1, wherein prior to the preparing of the payment record, the payment request is displayed on a display of the mobile device and payment is enabled by the customer.

23. The system of claim 6, wherein,
each of the mobile devices includes a display configured to display a payment request, and
the display is controlled to display the payment request before the payment record module prepares a payment record.

24. The method of claim 11, wherein prior to the preparing of the payment record, the payment request is displayed on a display of the mobile device and payment is enabled by the customer.

25. The system of claim 15, wherein,
the mobile device includes a display configured to display the payment request, and
the display is controlled to display the payment request before the second means prepares the payment record.

* * * * *